US006693281B2

United States Patent
Chen et al.

(10) Patent No.: US 6,693,281 B2
(45) Date of Patent: Feb. 17, 2004

(54) FAST NEUTRON RESONANCE RADIOGRAPHY FOR ELEMENTAL MAPPING

(75) Inventors: Gongyin Chen, Bowling Green, KY (US); Richard C. Lanza, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/039,487

(22) Filed: Dec. 31, 2001

(65) Prior Publication Data

US 2002/0171042 A1 Nov. 21, 2002

Related U.S. Application Data

(60) Provisional application No. 60/288,067, filed on May 2, 2001.

(51) Int. Cl.⁷ .............................................. G01N 23/00
(52) U.S. Cl. ............................ 250/390.04; 250/390.07
(58) Field of Search .................. 250/390.04, 390.07, 250/390.1, 390.11

(56) References Cited

U.S. PATENT DOCUMENTS

| | | | |
|---|---|---|---|
| 3,106,640 A | | 10/1963 | Oldendorf |
| 3,868,506 A | * | 2/1975 | Ogiso ........................ 250/278 |
| 4,900,940 A | * | 2/1990 | Nakamura .................. 250/560 |
| 4,918,315 A | | 4/1990 | Gomberg et al. |
| 4,987,585 A | * | 1/1991 | Kidd et al. ................. 378/197 |
| 5,818,054 A | * | 10/1998 | Randers-Pehrson et al. ..... 250/390.04 |
| 5,896,429 A | | 4/1999 | Lanza et al. |
| 5,930,314 A | | 7/1999 | Lanza |

FOREIGN PATENT DOCUMENTS

| | | |
|---|---|---|
| GB | 2 285 127 A | 6/1995 |
| WO | WO 97/41422 | 11/1997 |

OTHER PUBLICATIONS

"A Cooled CCD Based Neutron Imaging System for Low Fluence Neutron Sources," IEEE Trnas.Nuc.Sci., vol. 43, 1347–1351 (1996).*
"MCNP—A General Monte Carlo N–Particle Transport Code," Los Angeles National Laboratory, Mar. 1997.*
"COG—A Particle Transport Code Designed to Solve the Boltzman Equation for Deep– Penetration (Shielding) Problems," vol. 1, Users Manual, Lawrence Livermore National Laboratory Rept. # M–221–1 (1989).*
"Monte Carlo Modeling of Neutron and Gamma–Ray Imaging Systems," SPIE, vol. 2867, 465 (1996).*
International Search Report for PCT/US 02/08459, mailed Dec. 4, 2002.
Wangler, et al. (1989). "Conceptual design of an RFQ accelerator–based neutron source for boron neutron–capture therapy" Los Alamos National Laboratory Article LA–UR–89–912, Particle Accelerator Conference, Mar. 20–23, 1989: 678–680.

* cited by examiner

Primary Examiner—Diego Gutierrez
Assistant Examiner—Tania Courson
(74) Attorney, Agent, or Firm—Robert J. Sayre, Esq.; Mintz, Levin, Cohn, Ferris, Glovsky and Popeo, P.C.

(57) ABSTRACT

Methods and apparatus involving neutron resonance radiography are used to map the elemental composition of an object. Sets of neutrons having energies within particular energy bands are directed through an object to be imaged. The attenuation of the neutrons passed through the object is detected, and that data can be used to detect explosives, weapons, drugs and other contraband.

26 Claims, 8 Drawing Sheets

FAST NEUTRON RESONANCE RADIOGRAPHY FOR ELEMENTAL MAPPING

RELATED APPLICATION

This application claims priority to U.S. Provisional Patent Application Serial No. 60/288,067, filed May 2, 2001, and sharing the same inventors and title as the present application; the entire teachings of this provisional application are incorporated herein by reference.

GOVERNMENT SUPPORT

The invention was supported, in whole or in part, by the Office of National Drug Control Policy (ONDCP), under Contract DAAD07-98-C-0117, and by the Federal Aviation Administration, under Grant 93-G-053. The Government has certain rights in the invention.

BACKGROUND

The United States of America is a major consuming market of narcotic drugs and a primary target of terrorist attacks. Drug dependence is a chronic, relapsing disorder that exacts an enormous cost on individuals, families, businesses, communities, and nations. Terrorist highjacking and bombings, especially those involving and targeting civilian airplanes, greatly jeopardize the lives of the public.

Drugs, explosives and weapons are transported illegally by various methods. Large objects such as trucks or cargo containers are checked at the southwest (U.S.-Mexico) border for large amounts of drugs or other goods of interest, while passenger's luggage is screened for a small amount of explosives or drugs (100–300 grams) or for weapons at airports. There are a number of techniques currently used or proposed for defecting drugs, explosives and/or other contraband.

There have been many governmental efforts to develop detection technology for drugs, explosives and weapons led by the Office of National Drug Control Policy (ONDCP) and the Federal Aviation Administration (FAA). Commonly used methods for detecting drugs, explosives and/or weapons in parcels or cargo are described, below.

The oldest and perhaps the most reliable way of detecting hidden drugs and explosives is to check the suspected object manually. After the baggage or cargo container is opened and carefully searched, we can determine with a high level of confidence whether a weapon, an explosive device or an illegal drug is present. However, manual checking is slow, expensive and perhaps dangerous. In addition, manual inspection can violate societal norms and legal standards relating to privacy. Usually, only some randomly selected or highly suspected items are checked manually.

Use of a detector dog and its handler is another old, but still broadly used, technique for drugs and explosives detection. Canine olfactory systems are capable of reacting to the vapor of a number of compounds in drugs or explosives. When a dog is trained to detect a substance, it learns to discriminate the vapor of that substance from other odors in the environment by reacting to the compound(s) and earning positive reinforcement from the handler when it does so. A dog usually works for several hours a day but may not be willing to work at the required time. In addition, canine detection fails if no vapor is coming out of the package.

Drugs and explosives can also be detected by trace contaminants such as vapor or particulate residue. Air samples are collected, condensed, and then analyzed, very often with ion mobility spectrometer (IMS) detectors. Ways of collecting samples range from sniffing the vapors to wiping the surface, but they all depend on contamination. This detection method is used to screen people and/or boarding passes.

X-ray detection systems are the most commonly used for parcel and cargo inspection. X-ray transmission radiography or tomography is based on the attenuation of x-rays to image the electron density in the object under inspection. An experienced operator can identify different items by their density and shape distribution. X-ray systems are very effective in telling metal from organic material, but lack the ability to distinguish drugs or plastic explosives from ordinary goods. When low energy x-rays are used as the source, a second detector may be used to record the scattered x-rays. This generally helps to map low-Z material near the surface of the inspected object and is used to detect sheet explosives hidden in the parcel wall or other contraband beneath the wall of a cargo container. To reduce the cost and increase penetration, a radioactive gamma-ray source ($^{137}$Cs or $^{60}$Co) is sometimes used to replace the x-ray machine.

The use of neutron resonance radiography (NRR) has been described for applications other than detection of items such as explosives, weapons and drugs. NRR is based on the fact that, for a given element, the absorption of a beam of neutrons varies with neutron energy. Neutron absorption for a given element will typically show a series of relatively narrow peaks ("resonances") as a function of energy. If an image is taken at an energy matching the resonance energy and another image is taken at an energy off the resonance energy for a particular element, the difference of the two images will provide an enhanced image of that element. Thus, with appropriate choices of energies, an image may be taken of a particular element (e.g., carbon) within the object.

Neutrons of appropriate energies may be produced using a particle accelerator to accelerate beams of charged particles, such as protons or deuterons, onto a solid or gas target. In the usual method of performing resonance radiography, the energy of the accelerator is varied so as to produce beams of neutrons with a narrow range of energies. Each element is imaged at two energies. Further, the target used is made relatively thin in order to produce neutrons with a narrow range of energies. Such thin targets are inefficient producers of neutrons and also limit the accelerator output due to heating in the target.

SUMMARY

Methods and apparatus for mapping the elemental composition of objects, particularly parcel-size objects, by means of neutron resonance radiography (NRR) are further described, below. In methods of this disclosure, neutrons are produced in a relatively broad band of energies from an efficient thick target, and the angular dependence of the neutron energy can be used to scan multiple energies simultaneously and to measure several elements simultaneously. Further, the energy of the particle accelerator can be fixed; and thus, complications involved with changing accelerator energies are avoided. Compact fixed-energy accelerators may thus be deployed.

Unlike other resonance techniques, such as pulsed fast neutron transmission spectroscopy (PFNTS), the methods and apparatus disclosed herein do not require an accelerator that produces short pulses of neutrons; moreover, these same methods and apparatus can use a simple large imager as a detector. Complexity in both the accelerator and the detector is consequently avoided. In contrast, the PFNTS method determines neutron energy by measuring the velocity of the neutrons, and thus requires both a very short (on the order of nanoseconds) pulse of neutrons and a relatively long distance over which to measure their time of flight so as to determine energy, thereby increasing the space required for such a system.

In NRR methods further described below, two-dimensional elemental mapping of, for example, hydrogen, carbon, nitrogen, oxygen and the sum of other elements can be calculated using fast neutron radiographic images taken at different neutron energies chosen to cover the resonance features of one or more elements. A radiographic image provides the two-dimensional mapping of the sum of elemental contents weighted by their attenuation coefficients, and images taken at different neutron energies (at which the elements will have different attenuation coefficients) form a set of linear equations for each pixel in the image. These equations can then be solved to map individual elemental content. Contraband, such as explosives and drugs, can be identified by their characteristic elemental composition. Accordingly, pieces of passenger luggage can be imaged, in an airport, for example, with the methods taught herein to detect contraband such as explosive materials or drugs (e.g., cocaine) by their characteristic elemental compositions. Neutrons having different energies (e.g., 2–6 MeV) can be obtained at different angles from a deuteron-deuteron (DD) neutron source. A fixed-energy radio frequency quadrupole (RFQ) accelerator with a thick target can be used as the neutron source in NRR.

BRIEF DESCRIPTION OF THE DRAWINGS

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

1. Introduction

Fast Neutron Resonance Radiography (NRR) is a nuclear technique for the determination of two-dimensional elemental content distribution. Offering the major advantages of nuclear techniques, NRR can provide elemental information for detection of, e.g., explosives, weapons or drugs, and has the ability to penetrate thick objects.

An accelerator is used to produce source neutrons, which can have energies in the range of 2–6 MeV. The source neutrons are directed through an object under examination and are detected by a hydrogen-rich scintillator, which typically is formed of plastic. Light emitted from the scintillator is recorded using a solid-state charged coupled device (CCD) camera to form a radiographic image. For each image, the energy spectrum of the source neutrons is chosen to cover resonance features of one or more elements of interest.

Figure 1:
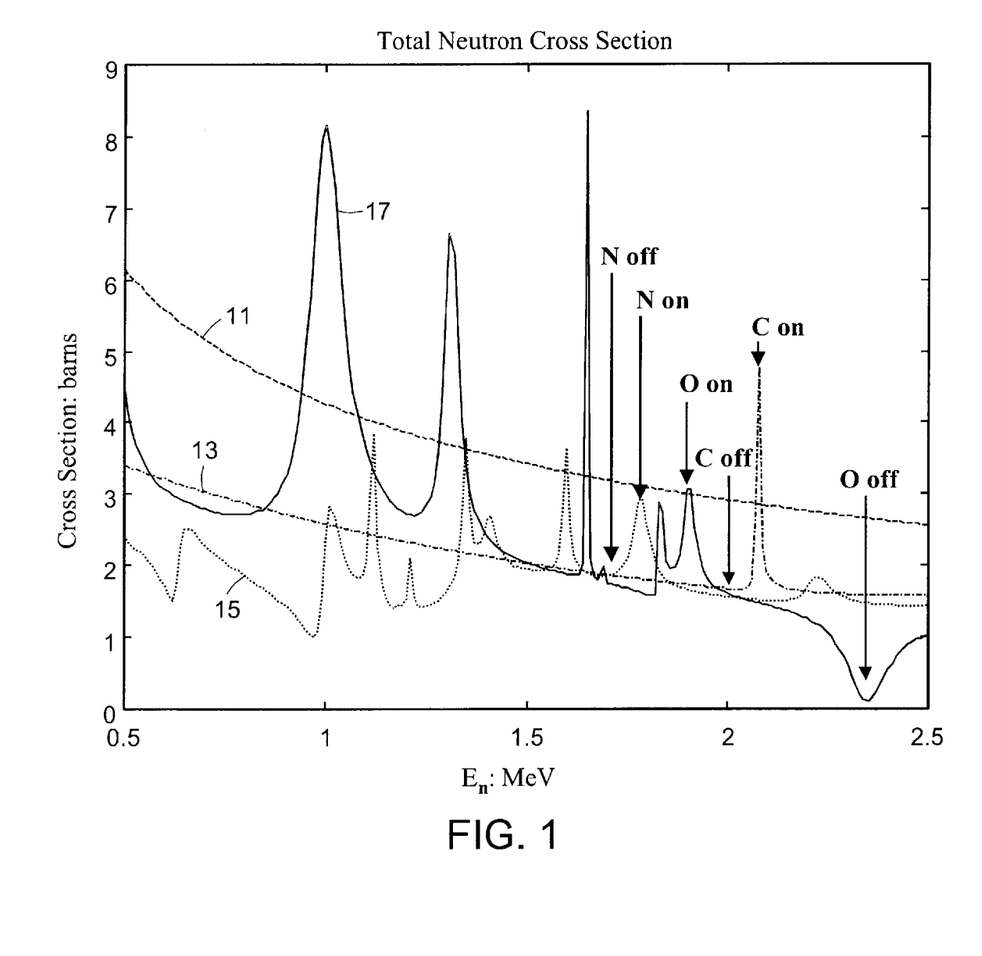
FIG. 1 charts the neutron cross-section (measured in barns) for hydrogen (H), carbon (C), nitrogen (N) and oxygen (O) over an energy range of 0.5 to 2.5 MeV.

The simplest case of NRR is to map one element at a time. FIG. 1 charts the neutron cross section (measured in barns) for hydrogen (H) 11, carbon (C) 13, nitrogen (N) 15 and oxygen (O) 17 over an energy range of 0.5 to 2.5 MeV. A resonance peak/valley (marking a high or low point on the vertical axis) for one element is targeted where the cross sections of other elements are relatively flat over the same energy range. A radiographic image is taken at the "on-resonance" neutron energy (i.e., the energy at the peak or valley), and another radiographic image is taken at a second energy, typically an "off-resonance" neutron energy (i.e., an energy level that is neither a peak nor a valley). The pixel-by-pixel difference of the two images provides a two-dimensional map of the corresponding element.

Several representative materials were tested, and the images produced are shown in FIGS. 2A–2D, which illustrate "typical" contraband. The materials were packaged in 3-cm-diameter plastic containers, each containing 10 to 30 g of material. The circle in the upper left of each image represents a drug simulant 12 with the following elemental composition: $m_H$=1.5 g, $m_C$=16.3 g, $m_N$=0.9 g and $m_O$=5.2 g. The circle in the upper right of each image represents graphite 14 comprising 10.8 g carbon. The circle at lower right represents melamine 16 comprising the following elements: $m_H$=1.8 g, $m_C$=10.6 g and $m_N$=24.9 g. Finally, the lower-left circle represents an explosive simulant 18 having the following elemental composition: $m_H$=1.0 g, $m_C$=7.1 g, $m_N$=7.1 g and $m_O$=12.3 g.

Figure 2A:
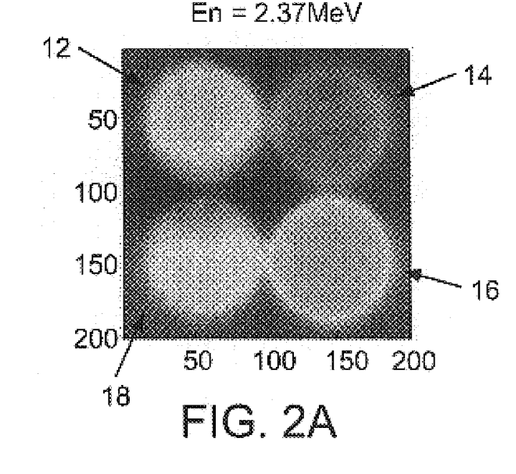
FIG. 2A illustrates experimental transmission of four compositions for neutrons at 2.3 MeV, wherein red areas indicate regions of high neutron transmission, while colors toward the blue end of the color spectrum represent areas of higher neutron attenuation.
Figure 2B:
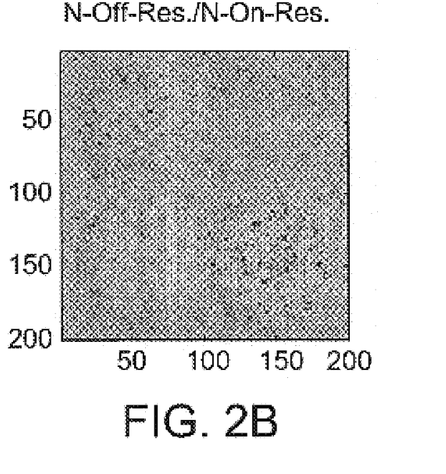
FIG. 2B illustrates a ratio of off-resonance versus on-resonance neutron permeability for nitrogen in the four compositions of FIG. 2A; in this image, yellow and, particularly, red areas highlight regions where nitrogen is detected.
Figure 2C:
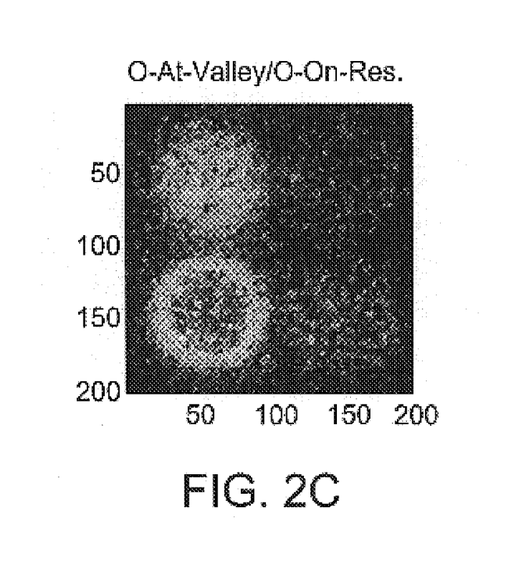
FIG. 2C illustrates a ratio of off-resonance versus on-resonance neutron permeability for oxygen in the four compositions of FIG. 2A; in this image, yellow and, particularly, red areas highlight regions where oxygen is detected.
Figure 2D:
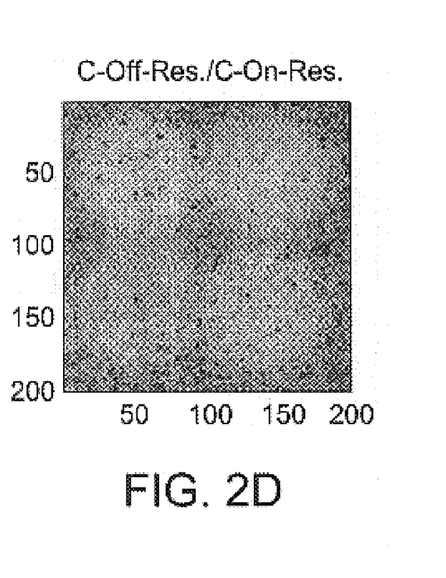
FIG. 2D illustrates a ratio of off-resonance versus on-resonance neutron permeability for carbon in the four compositions of FIG. 2A; in this image, yellow and, particularly, red areas highlight regions where carbon is detected.

FIG. 2A illustrates experimental transmission of the four compositions for neutrons at 2.3 MeV. Transmission is greatest at the red end of the visible color spectrum, while transmission is lowest (and hence, attenuation is highest) at the blue end of the color spectrum. Accordingly, it is evident that, of the four compositions, melamine had the highest neutron attenuation in this example. FIGS. 2B, 2C and 2D show respective ratios for off-resonance versus on-resonance neutron transmission for nitrogen, oxygen and carbon; in these images, yellow and, particularly, red areas highlight regions where the respective element is detected.

It becomes increasingly difficult to find a single peak when additional elements are considered. Resonance peaks found as described above are generally very narrow; accordingly, neutron beams with energies isolated at these peaks are difficult to obtain, even when using a variable-energy charged-particle accelerator and a thin target to generate a monoenergetic neutron source in accordance with other methods. Moreover, the use of thin lithium (Li) targets limits beam currents due to target heating. Further still, neutron energy does not drop uniformly across different angles. When objects of finite size are exposed to the neutrons, different parts of the object are exposed to neutrons at different angles. Consequently, one part of an image may be "on-resonance" while another part of the image is not.

Another approach is to consider each radiographic image as a two-dimensional map of projected attenuation. It can also be thought of as a two-dimensional map of the sum of content of all existing elements, weighted by their attenuation coefficients. For each pixel in the image, there exists a linear equation stating that the total attenuation equals the weighted sum of projected elemental contents. When another radiographic image is taken at a different energy spectrum, the resulting linear equation has different attenuation coefficients (i.e., weighting factors) and total attenuation, but has the same projected contents because the object is the same. In principle, when there are more equations than the number of existing elements, the set of linear equations can be solved for a definite least-squares solution of projected elemental contents.

The attenuation coefficients are related to the total neutron cross sections over the energy spectrum of the source neutrons. Unlike x-ray attenuation, fast neutron attenuation coefficients vary only moderately from energy to energy and from element to element. The difference is typically within a factor of 2 to 3, which is considered to be neither too small nor too large to facilitate resolution of the linear equation set. Elements other than hydrogen, carbon, nitrogen, and oxygen are modeled as one component to reduce the number of equations required. H, C, N, O, and "other" are used to represent these five components. This approach is generally appropriate to luggage scanning, though other elements or combinations of elements can be mapped, as desired, in accordance with these methods.

By using the broad resonance and linear equation methods described herein, image pixels can be calibrated independently, thereby eliminating the need to have the same incident-neutron energy across the object.

2. Fast Neutron Resonance Radiography

When a radiographic image is taken with neutrons having a broad energy range, (e.g., 4.487–5.525 MeV, as shown by the 25° stripe in FIG. 3) resonance features of more than one element are covered. It turns out that two such images usually are not enough to give us the two-dimensional mapping of any element. However, when more than two images are taken, the two-dimensional mapping of all elements involved can be solved.

Using a broad-spectrum neutron source exploits the characteristically broad resonance features of elements, thereby improving resonance contrast in comparison to choosing narrow peaks. In addition, differences among the images (e.g., seven or more) are summed, which facilitates mapping of elements (e.g., nitrogen) that are present at low concentrations.

3. Linear Attenuation Model

An energy bin that contains a resonance feature of one or more elements is selected, and a radiograph is taken using neutrons having energies within that energy bin. Each element attenuates neutrons as if this single element was alone in the path, and the total attenuation, b, is the sum of attenuation by all elements present. The so-formed equation, stating that the total attenuation is the sum of attenuation by all elements, is not sufficient to tell us the contents of any element. We thus take radiographic images at additional energy bins and obtain additional similar equations. For example, we can take m radiographic image at m energy bins for the bulk material composed of n elements, and we obtain the following equations for each pixel over the image:

$$a_{11}x_1+a_{12}x_2+a_{13}x_3+ \ldots +a_{1j}x_j+ \ldots +a_{1n}x_n=b_1$$

$$a_{21}x_1+a_{22}x_2+a_{23}x_3+ \ldots +a_{2j}x_j+ \ldots +a_{2n}x_n=b_2$$

$$a_{i1}x_1+a_{i2}x_2+a_{i3}x_3+ \ldots +a_{ij}x_j+ \ldots +a_{in}x_n=b_1$$

$$a_{m1}x_1+a_{m2}x_2+a_{m3}x_3+ \ldots +a_{mj}x_j+ \ldots +a_{mn}x_n=b_m$$

In the equations, "$a_{ij}$" is the attenuation coefficient of element "j" at energy band "i"; "$x_j$" is the unknown projected content of element "j"; and "$b_i$" is the measured total attenuation at energy band "i." Variable "$a_{ij}$" is related to the total cross section over the source neutron energy range, which can be determined in advance. There are m equations (representing respective images at m energy bands) with n unknowns (corresponding to n elements that are mapped). When m>n, there exists a least squares solution. In order to reduce the number of equations (images), all elements other than H, C, N, and O are represented with one attenuation component, which is flat over the energy range. In the solution, the content of most other elements is split between "H" and "other." Therefore, larger relative error is expected for hydrogen, especially when a substantial quantity of aluminum is present. The flat component also compensates for internal scattering effects within the object. The linear attenuation model assumes the following two facts: (1) the attenuation by one element is linearly dependent on its projected content and (2) the existence of one element does not affect the attenuation of other elements.

It should be noted here that although a linear model is used for fitting the data in the above description, it is not the only method that can be used. For example, non-linear fitting methods may be used or other fitting techniques, such as simulated annealing methods, may be used. A common aspect of all of these methods is that the entire spectrum of neutrons can be used for fitting and thus the utilization of neutrons is very efficient, thereby reducing both accelerator power and the amount of shielding used in a deployed system.

The equations, above, can be written in the compact matrix form, Ax=b. The attenuation coefficients can be determined by experiment or by simulation. As long as m≧n, the equation set is solvable.

Consider the problem of finding the elemental composition vector $x \in R^n$, where R is the vector space, such that Ax=b when the attenuation coefficient matrix $A \in R^{m \times n}$ and the measured attenuation vector $b \in R^m$ are given. Usually, there are more equations than unknowns; that is, m>n, and the set is over-determined. Unless b belongs to R(A), the vector space defined by A, the over-determined set has no exact solution. There are many possible ways of defining the "best" solution; one example is a least squares approach.

The least squares solution of over-determined equations Ax=b is expressed as:

$$A^T A x = A^T b \to x_{LS} = (A^T A)^{-1} A^T b = A^{\vee} b.$$

This does not mean that $x_{LS}$ should be calculated in the above manner. In fact, this calculation is not recommended for two reasons: (1) calculating the inverse matrix is computationally intensive, and (2) it introduces large errors. Direct Householder transform can be used to solve the least squares problem without increasing the condition number.

Figure 4:
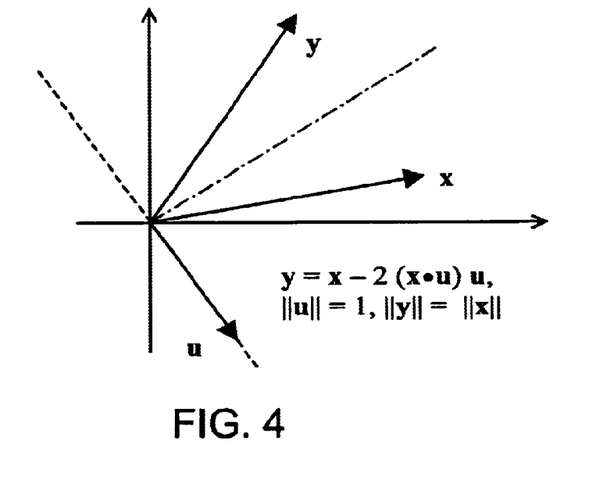
FIG. 4 illustrates the vector analysis performed using a Householder transform.

Householder transform reflects one vector on another vector, as shown in FIG. 4. The image vector, y, is determined by the object vector, x, and the mirror vector, u. On the other hand, if we have the object vector, x, and want to reflect it into a certain direction (for example, $y=\|x\|e_1$, where $e_1=(1, 0, 0, \ldots, 0)^T$), the mirror vector, u, can be derived from the reflection equation, $y=x-2(x \cdot u)u=\|x\|e_1$.

$$u = \frac{x - \|x\|e_1}{\|x - (\|x\|e_1)\|}$$

That is, u can be found by subtracting from x the desired image, $\|x\|e_1$. Normalization is then performed. In matrix form, $$y=(I-2u\, u^T)x=\|x\|e_1$$

where u is found in the above expression. The matrix, $Q=I-2u\,u^T$, is called a Householder Matrix. It is orthogonal and normalized, and it has the following properties:

$$Q^T=Q;\ Q^T Q=I;\ Q^2=I;\ Q^{-1}=Q$$

Now it is straightforward to up-triangularize matrix, A, column by column (treat each column as an object vector, one at a time), until it consists of n up-triangularized equations and m-n residual equations. The n equations can then be solved by backward elimination.

The process is expressed as: $Q_n Q_{n-1} \ldots Q_2 Q_1 A x = Q_n Q_{n-1} \ldots Q_2 Q_1 b$, or $$\begin{bmatrix} a_{11} & a_{12} & \cdots & a_{1n} \\ a_{21} & a_{22} & \cdots & a_{2n} \\ \cdots & \cdots & \cdots & \cdots \\ a_{n1} & a_{n2} & \cdots & a_{nn} \\ \cdots & \cdots & \cdots & \cdots \\ a_{m1} & a_{m2} & \cdots & a_{mn} \end{bmatrix} \cdot x = \begin{bmatrix} b_1 \\ b_2 \\ \cdots \\ b_n \\ \cdots \\ b_m \end{bmatrix} \Rightarrow \begin{bmatrix} a_{11} & a_{12} & \cdots & a_{1n} \\ 0 & a'_{22} & \cdots & a'_{2n} \\ \cdots & \cdots & \cdots & \cdots \\ 0 & a'_{n2} & \cdots & a'_{nn} \\ \cdots & \cdots & \cdots & \cdots \\ 0 & a'_{m2} & \cdots & a'_{mn} \end{bmatrix}.$$

$$x = \begin{bmatrix} b_1 \\ b'_2 \\ \cdots \\ b'_n \\ \cdots \\ b'_m \end{bmatrix} \Rightarrow \cdots \Rightarrow \begin{bmatrix} * & * & \cdots & * \\ 0 & * & \cdots & * \\ \cdots & \cdots & \cdots & \cdots \\ 0 & 0 & \cdots & * \\ \cdots & \cdots & \cdots & \cdots \\ 0 & 0 & \cdots & 0 \end{bmatrix} \cdot x = \begin{bmatrix} * \\ * \\ \cdots \\ * \\ \cdots \\ \Delta \end{bmatrix}$$

$Q = Q_n Q_{n-1} \ldots Q_2 Q_1$ is also orthogonal and normalized. The resulting matrix, QA, is no more ill conditioned than matrix, A, $\kappa(QA)=\kappa(A)$. In other words, the Householder transform does not increase the upper limit of error. Therefore, this method is, in general, expected to be more stable than other methods.

In the detailed matrix expression above, * marks represent modified numbers and $\Delta$ represents small residual errors. The Householder method leads to the same solution as the normal equation does, $x_H=x_{TLS}$. When programming, there is no need to calculate the matrices, Q1, Q2, etc, explicitly.

4. Setup and Neutron Source

Figure 5:
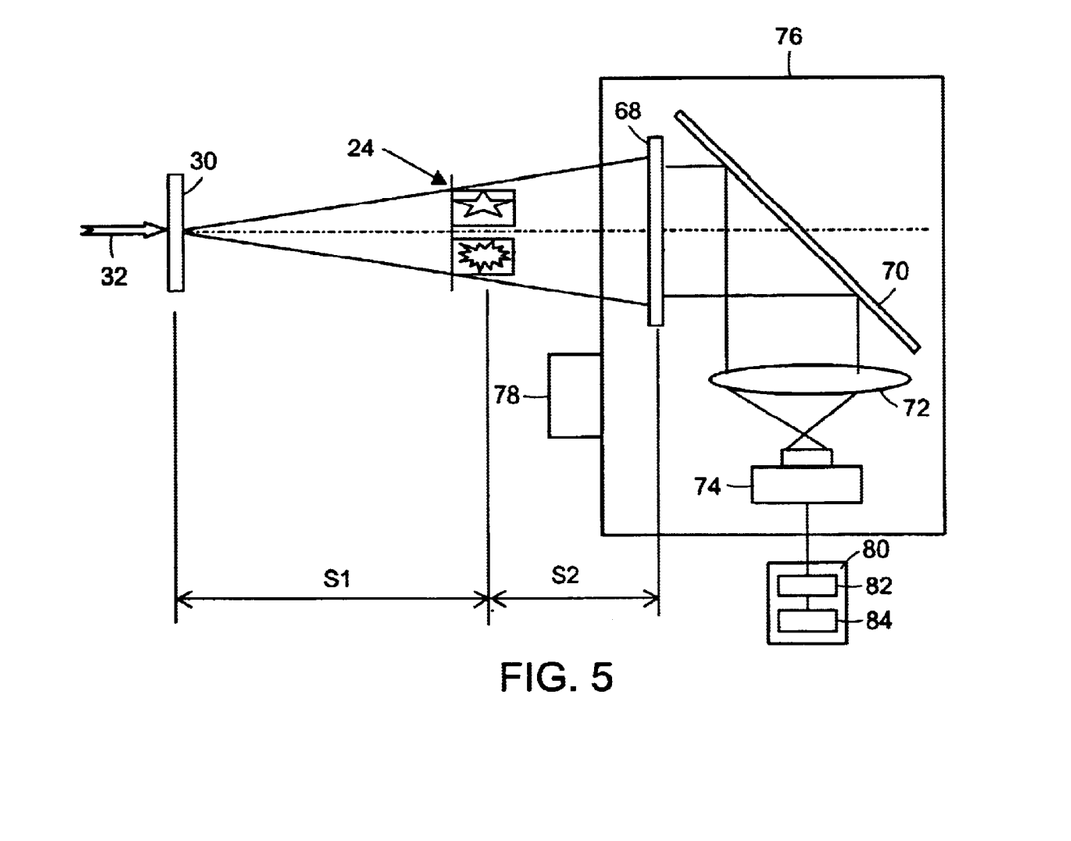
FIG. 5 is an illustration of a fast neutron radiography apparatus.

A typical fast neutron radiography setup is illustrated in FIG. 5. As noted, above, the neutron source is usually accelerator based. A proton beam or deuteron beam 32 is accelerated to the desired energy and bombards the target material 30 to produce fast neutrons by a nuclear reaction. Scintillation screens 68 are typically used for fast neutron radiography, and a mirror 70, a lens 72 and a CCD (chip) 74 camera are employed to record the image of objects 24. The mirror 70 is used to avoid direct neutron irradiation of the CCD camera 74, and the lens focuses light onto the CCD camera 74 and helps to collect more light. The light from neutron detection is extremely weak, so the scintillator 68, mirror, lens 72 and CCD camera 74 are light-sealed in a dark chamber 76. Additional shielding 78 is provided to protect the CCD camera 74 against direct irradiation from the neutron source.

The most common way of producing the fast neutrons is through nuclear reactions, which can be triggered, as in the above-described apparatus, with a particle accelerator and a target. In particular examples, a p-$^7$Li source or a deuteron-deuterium (DD) source can be used to produce the fast neutrons. The former source involves two nuclear reactions, while the latter source has only one reaction channel.

p-$^7$Li source:

$^7\text{Li}+p=^7\text{Be}+n-1.646\ MeV$ $^7\text{Li}+p=^7\text{Be}^*+n-2.076\ MeV$ DD source:

$^2\text{H}+d=^3\text{He}+n+3.27\ MeV$

The p-$^7$Li reaction is endothermic. The resulting Be nucleus can be in a ground state or in an excited state, emitting a 428 keV gamma ray when de-exciting. The threshold proton energy is 1.88 MeV for the ground state reaction and 2.37 MeV for the excited state reaction. The cross section of the second reaction is much lower than for the first reaction when the proton energy is below 5 MeV, so the first group of neutrons can be thought of as mono-energetic contaminated by lower energy neutrons.

The DD neutron source is the source most commonly used for neutron production in the 3 MeV to 12 MeV energy range. The reaction in a DD source is characterized by a single neutron group. The reaction is exothermic, and it has a Q-value of +3.27 MeV. The minimum neutron energy in the forward direction is 2.6 MeV.

Figure 6:
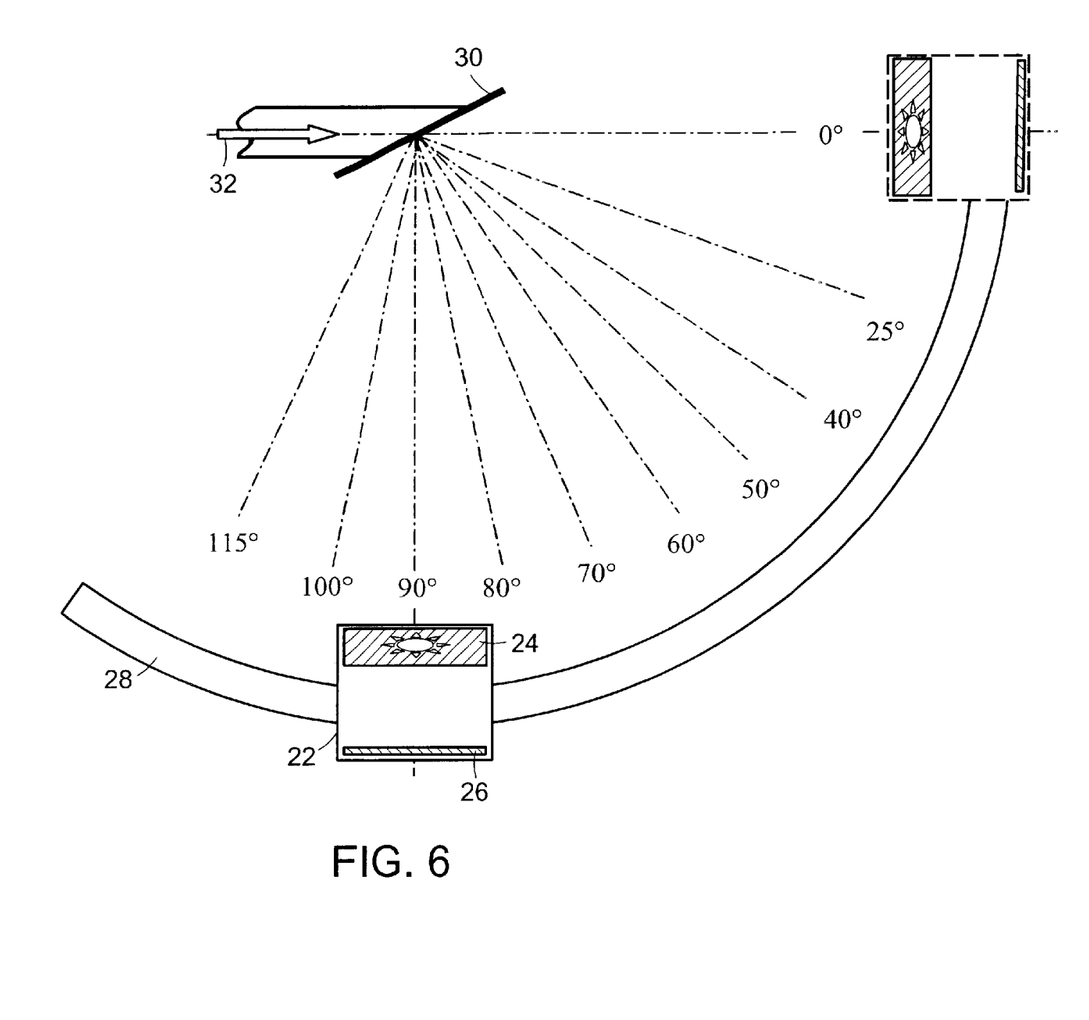
FIG. 6 illustrates an apparatus including a deuteron accelerator and a neutron-emitting target; the apparatus also includes an object and a detector aligned relative to the target and displaceable along an arc about the target to receive neutrons emitted at different angles.

Neutrons of different energies are obtained by rotating the object-detector assembly around the DD neutron source, as shown in FIG. 6 and described further, below. It is estimated that a practical neutron flux can be achieved with 100 µA average deuteron current.

Using the angular dependence of the DD neutron energy spectrum allows the use of a fixed-energy accelerator, such as a radio frequency quadrupole (RFQ), and a thick target to generate fast neutrons. RFQ ion accelerators are compact, high-beam current devices usually designed to accelerate a specific ion to a fixed energy. Deuterons are the accelerated ions in one embodiment, and the target 30 can be high-pressure deuterium gas or a solid (deuterated) target. Solid targets can have a thickness of about 10 microns. A gas target in the form of a gas cell at 1–3 atm pressure can have a thickness on the order of a centimeter, though the optimal thickness is a function of the mass density of the target composition. In any case, the thickness of the target can be selected to produce a suitably broad range of neutron energies across the neutron-emission spectrum since the energy of emitted neutrons is a function of the energy of the accelerated deuteron, which loses energy as it passes through the target. Consequently, the use of thicker targets results in a broader range of emitted-neutron energies. Where testing is focused on single peaks in procedures measuring attenuation by subtracting a detector reading at an off-resonance energy with an on-resonance energy peak, thin targets that reduce the energy of an accelerated deuteron by about 50 keV as the deuteron passes through the target are used. Whereas, in the broad-spectrum methods disclosed herein, the target can have sufficient thickness to reduce the energy of the accelerated deuteron by about 0.4 to about 0.8 MeV as the deuteron passes through the target.

It is advantageous to employ solid-state targets because they can be directly mounted at the end of a vacuum beam path, with deuterated material bombarded by a deuteron beam. Isotopes of hydrogen are readily absorbed in titanium or zirconium to form metal hydrides. These metals are usually evaporated onto a metal backing. Titanium is the most commonly used occluding metal because it has the lowest stopping cross section of elements with a strong affinity for hydrogen and a high thermal conductivity. A typical ratio of occluded deuteron atoms to titanium atoms is 1.5, and the evaporated titanium layer ranges from 0.2 to 4 mg/cm$^2$.

After passing from the target 30 through the object 24, neutrons are measured by a detector, which can include a scintillator 68 and a charge coupled device (CCD camera) 74, as shown in FIG. 5. In the scintillator 68, fast neutrons are scattered by hydrogen nuclei and the energetic recoil proton ionizes and excites the molecule or crystal of the scintillator, causing the emission of light. Suitable scintillators include plastic scintillators such as NE102 scintillators from Nuclear Enterprises, Inc. and BC400 and BC430 scintillators from Bicron Corporation (Newbury, Ohio, USA). Other suitable plastic scintillators are made by Applied Scintillation Technologies, Elgen and Scionix. Alternatively, the scintillator can be an inorganic ZnS(Ag) (silver-activated ZnS dispersed in polypropylene) scintillator.

Scintillation light from the neutron detector is generally reflected with a mirror 70 and then collected with a lens 72 onto a charge coupled device (CCD) chip 74, which converts individual photons into electrons. A CCD is an analog integrated circuit that converts an optical image into an electronic one. Electrons, induced by photons are accumulated in each pixel during the exposure time and transferred (usually sequentially) to readout electronics thereafter. After a desired exposure time, the number of electrons in each pixel is converted to a digital level that is communicated to a computer 80 coupled therewith, the computer 80 generating the final digital image.

In fast neutron radiography, the detector works in an integrating mode, in which the CCD camera 74 records the total amount of light emitted from small areas of the scintillation screen 68. Light output from individual neutron events is different. The incident neutron may transfer its full energy to the recoil proton in a head-on collision or part of its energy when scattering at an angle. It could also scatter on a carbon nucleus, losing some energy, or it could experience multiple scattering within the scintillator. Furthermore, different amounts of light are expected for the same amount of total energy if the scattering histories (i.e., the number of prior collisions) are different. Nevertheless, the sum total of emitted light at each pixel relative to that at other pixels generally reflects the relative number of neutrons passing through the object at that pixel at a given neutron energy.

The equation governing fast neutron radiography is from the exponential attenuation law.

$$N=N_0 \cdot e^{-\mu \cdot x}$$

In the above equation, "N" is the attenuated neutron number in a small area of the detector, "$N_0$" is the corresponding source neutron number without attenuation, "$\mu$" is the effective attenuation coefficient (unit: cm$^2$) and "x" is the effective total projected atomic content (unit: #/cm$^2$).

Further description of neutron imaging conducted with a scintillator and a cooled CCD camera is provided in R. C. Lanza, S. Shi, and E. W. McFarland, "A Cooled CCD Based Neutron Imaging System for Low Fluence Neutron Sources," IEEE Trans. Nuc. Sci., Vol. 43, 1347–1351 (1996), which is incorporated herein by reference in its entirety.

The imaged object can be exposed to neutrons having different energies by rotating the aligned object-detector assembly around the neutron source, as illustrated in the embodiment of FIG. 6. A mount 22 supports the object 24 and positions the object 24 in the path of emitted neutrons. The mount 22 is coupled with a drive mechanism 28 (typically, a motor designed to generate physical displacement via circumferential rotation or other means) for repositioning the mount in various radial sectors of the total neutron-emission spectrum about the neutron-emitting target 30. Alternatively, the target 30 can be repositioned by the drive mechanism so as to put the object and detector at a different position within the neutron-emission spectrum (in such embodiments, the neutron-emission spectrum is rotated rather than the object and detector). The neutron-emission spectrum shown across the range of angles illustrated in FIG. 6 is a product of the use of a thick target 30, with the accelerated deuterons projected along the path illustrated by arrow 32. In one example, the object 24 and detector 26 (which can comprise the components within dark chamber 76 in FIG. 5) are rotated by positioning the object and detector on a rotatable wheel that is centered at the source and coupled with a rotary motor at its axis of rotation.

Figure 3:
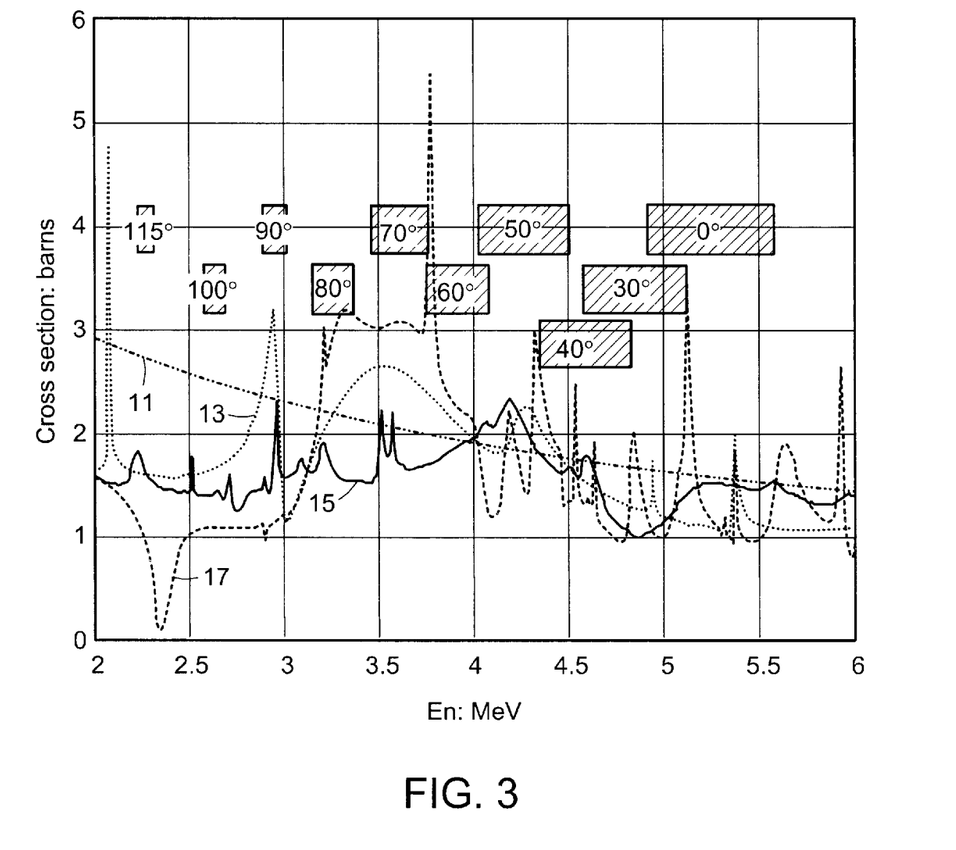
FIG. 3 illustrates the attenuation, or neutron cross-sections, for hydrogen, carbon, nitrogen and oxygen over a range of neutron energies from 2 to 6 MeV. The illustrated boxes above the charted attenuation curves represent "energy bins" showing the range of neutron energies in this example at various angles shown in FIG. 6.

This practice is different from tomography in which the detector and source are aligned and the object rotates around a fixed axis. Suppose the energy of the accelerated deuteron ($E_d$)=2.3 MeV and $\Delta E_d$=0.8 MeV (thick target). The energy range of emitted neutrons changes from 4.70–5.55 MeV at 0° to 2.27–2.33 MeV at 115°. FIG. 3 illustrates the attenuation, or neutron cross sections, for hydrogen 11, carbon 13, nitrogen 15 and oxygen 17 over a range of neutron energies from 2 to 6 MeV. The illustrated boxes above the charted attenuation curves represent "energy bins" showing the range of neutron energies in this example at various angles shown in FIG. 6. At each nominal angle, the neutron energy spectrum varies over the image, so different attenuation coefficients are used for different parts in the images. For a measurement of hydrogen, carbon, nitrogen, oxygen and "other," neutron energy should ordinarily vary from as high as 4.75 MeV to 5 MeV to cover the broad valley of nitrogen 15 to as low as 2.25 MeV to 2.5 MeV to cover the valley of oxygen 17.

In mapping the concentration and distribution of two elements in an object, the object 24 and detector 26 are positioned at at least three different angular positions within the neutron-emission spectrum, as shown in FIG. 6; and neutrons at respective energies corresponding with each of the angular positions pass through the object 24 to the detector 26, which generates a reading of the spatial distribution of the detected neutrons. Where, for example, the spatial concentration and distribution of each of hydrogen, carbon, nitrogen and oxygen in an object are mapped, detector readings at at least five energies are generated by exposing the object and detector to neutrons in the neutron-emission spectrum at at least five angular positions. The linear-attenuation model describe in section (3), above, can then be used to solve for the content of each element at each pixel within a larger two-dimensional image.

With higher attenuation, fewer neutrons reach the detector array. The detector generates a reading of the number and distribution of neutron impacts upon the detector. This reading can be in the form of pixel-by-pixel measurements from a CCD camera 74 (see FIG. 5), and it is communicated to a computer processor 82 that executes software code stored in computer-readable memory 84. The software code performs the calculations, described above, for mapping elements based on input data from the detector readings. The processor 82, operating the software code, then generates a map or a plurality of maps of elemental compositions within the object and communicates that map to a display or printer so that the map can be viewed by the system operator. Alternatively, or in addition, the compositions and/or shapes of a substance or object to be detected can be stored in the computer-readable memory 84. For example, a library can be established for the compositions of various drugs or explosives. The processor 82 can compare these compositions and/or shapes with the compositions and/or shapes derived from the detector readings to determine (if there is a substantial match) whether the substance or object to be detected is suspected to be present, whereupon additional attention can be devoted to the investigation of the suspect substance/object.

CCD defects lead to dark or white points, lines or clusters in the digital image. When radiation (neutrons, gamma rays or cosmic rays) hits the CCD chip, there might be an interaction with silicon, creating an energetic charged particle. The resulting charged particle will generate a lot of electron-hole pairs and leads to a white point or points, often referred to as "sparkles." The computer removes these sparkles with a nonlinear filter, which changes the white pixel to the median value of the pixels within its neighborhood (e.g., the 3×3 or 5×5 block surrounding it). Sparkles are detected with a deviation check, wherein a pixel value is replaced with the median value only when it deviates from the median within the neighborhood to a certain extent (e.g., one standard deviation of the neighborhood values). This modified median filter removes sparkles but preserves fine structures in the digital image.

Simulated Exemplification

The following example is a simulation of elemental mapping using fast neutron resonance radiography in accordance with the methods described, above.

In this simulation, the attenuation coefficients of the simulated object are generally smaller than the average cross section of the simulated object over the corresponding neutron energy range. Rather than calculating these coefficients directly from cross-section data, MONTE CARLO N-PARTICLE (MCNP) transport code was executed by a computer to simulate the path of neutrons into and through the object and the consequent attenuation of neutrons in the object, as explained in Judith F. Briesmeister, "MCNP—A General Monte Carlo N-Particle Transport Code," Los Alamos National Laboratory, March 1997, which is incorporated herein by reference in its entirety. In the simulation for determining the attenuation coefficients, a slab of pseudo-single-element material was placed between a source and a detector, with the same geometry as shown in FIG. 6. The attenuation coefficients were calibrated for $0–1.0\times10^{24}$ atoms/cm$^2$ for each element.

Radiographic images were then simulated using the radiation transport code, "COG," developed at Lawrence Livermore National Laboratory, as explained in T. Wilcox and E. Lent, "COG—A Particle Transport Code Designed to Solve the Boltzman Equation for Deep-Penetration (Shielding) Problems," Vol. 1, Users Manual, Lawrence Livermore National Laboratory Rept. # M-221-1 (1989), and in J. Hall, "Monte Carlo Modeling of Neutron and Gamma-Ray Imaging Systems," SPIE, Vol. 2867, 465 (1996), both of which are incorporated herein by reference in their entirety. The source-to-object and object-to-image distances used in the simulations were 150 cm and 50 cm, respectively, giving an imaging angle of ±10° and a magnification factor of 1.33. The energy spectrum of the neutron source was adjusted downward from 5.55–4.70 MeV to 2.33–2.27 MeV in a series of 10 runs to simulate scanning the object through angles ranging from 0° to 115° relative to the axis of a real DD neutron source. Images of the direct (unscattered) neutron flux from the source and scattered neutrons in several bins at lower energies were generated using 200×200 pixel imaging detectors with appropriate energy and scattered-particle masks. These direct/scattered neutrons were summed together (weighted by energy) to form real images. The simulations were each run with $5\times10^8$ test particles on the ASCI Blue Pacific supercomputer at Lawrence Livermore National Laboratory using 256 processors operating in parallel.

Figure 7:
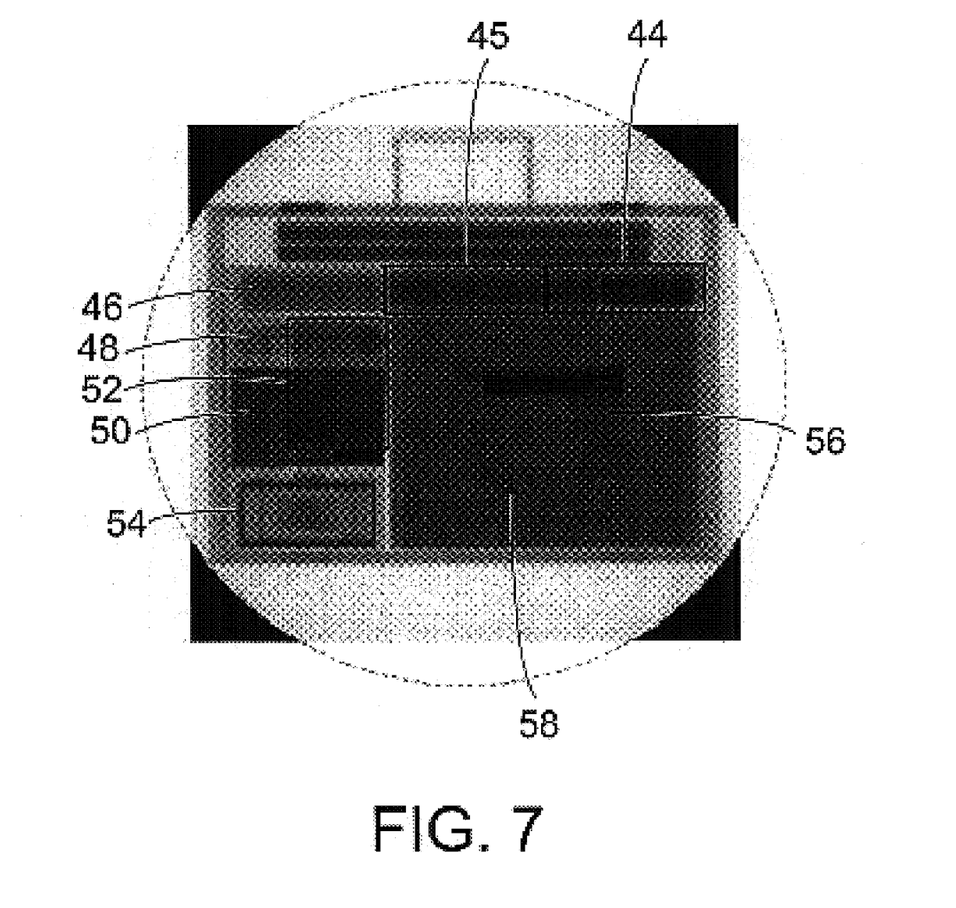
FIG. 7 shows a neutron radiographic simulated image of a bag at 0°, as shown in FIG. 6, and marks the locations of hidden explosives, weapons and drugs.

The object modeled in these simulations was a sort of "terrorist overnight bag." The bag itself consisted of a thin aluminum shell (40×30×10 cm) with a wood handle, thick cloth covering and steel fittings. FIG. 7 shows a neutron radiographic simulated image of the bag at 0° (the 0° angle illustrated in FIG. 6) and marks the locations of hidden explosives and drugs. As shown in FIG. 7, the bag contained a newspaper, a bag of sugar (105 g) 42, a stash of cocaine-HCl (105 g) 44, a travel umbrella 46, a 10-cm switchblade knife 48, a paperback book 50, a block of plastic explosive (270 g; 50/50 weight % mix of RDX and PETN), a pen and pencil set, a small camera 54, an automatic pistol 56 with extra ammo clip 58, a flat paper notebook and a selection of cotton, wool and nylon clothing items. The bag was heavily loaded and had an average density of around 0.5 g/cm$^3$. These items were not directly evident from the original images produced from simulated detector readings.

Figure 8A:
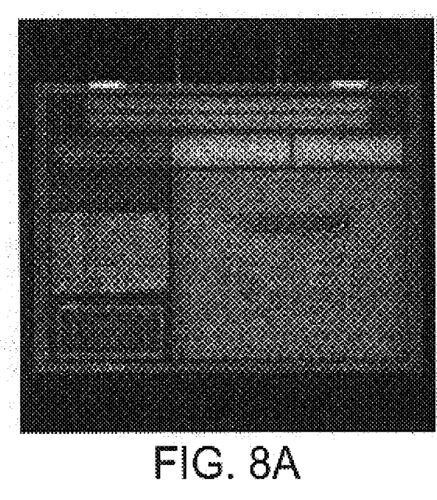
FIG. 8A provides a mapping of the projected hydrogen content in the simulated bag of FIG. 7.
Figure 8B:
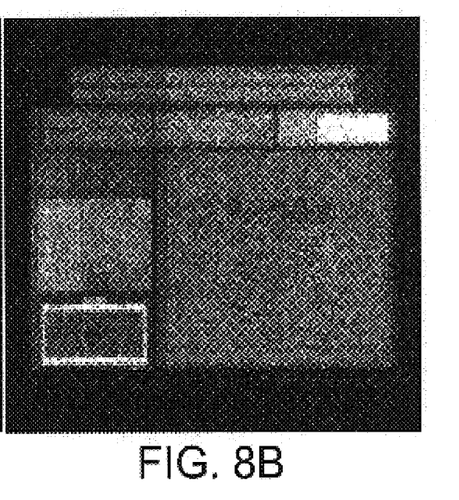
FIG. 8B provides a mapping of the projected carbon content in the simulated bag of FIG. 7.
Figure 8C:
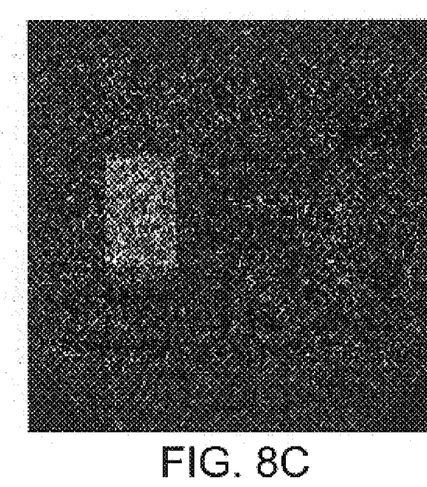
FIG. 8C provides a mapping of the projected nitrogen content in the simulated bag of FIG. 7.
Figure 8D:
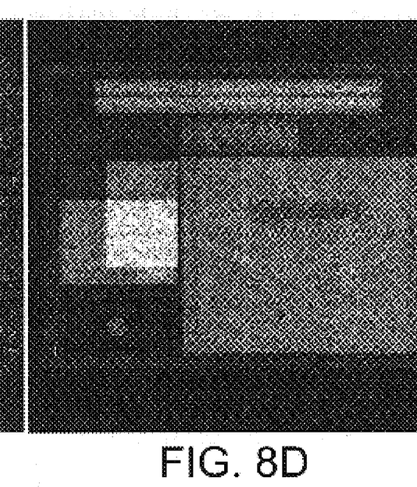
FIG. 8D provides a mapping of the projected oxygen content in the simulated bag of FIG. 7.
Figure 8E:
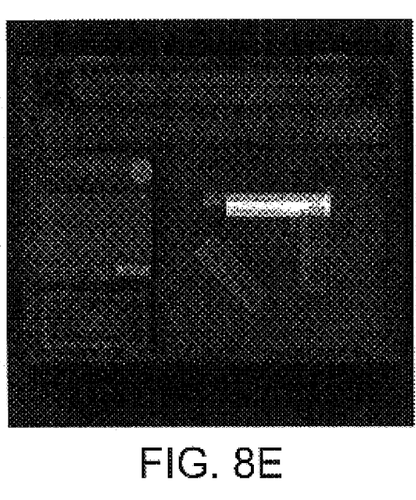
FIG. 8E provides a mapping of the summed projected content of all other elements in the simulated bag of FIG. 7.
Figure 8F:
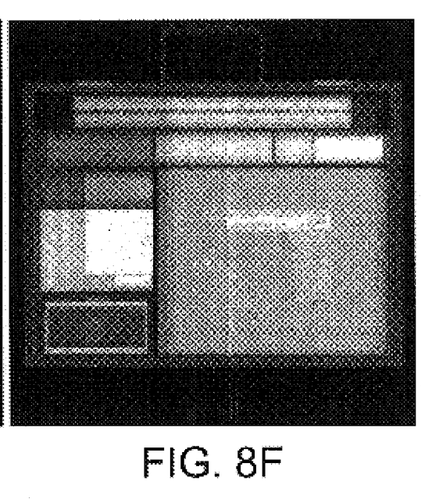
FIG. 8F provides a mapping of the projected summed content of all elements in the simulated bag of FIG. 7.

The calculated elemental mappings of this simulation, derived using the attenuation model described above, are provided in FIGS. 8A–8F. In each of the simulated images, the elemental concentration was determined pixel by pixel as a function of the degree of neutron attenuation within the object at the region defined by each pixel. FIG. 8A illustrates the projected hydrogen content in the bag. FIG. 8B illustrates the projected carbon content in the bag. FIG. 8C illustrates the projected nitrogen content in the bag. FIG. 8D illustrates the projected oxygen content in the bag. FIG. 8E illustrates the summed projected content of all other elements in the bag. FIG. 8F illustrates the projected summed content of all elements in the bag.

In the mappings, the simulated plastic explosive can be identified by its high nitrogen/oxygen content (see FIGS. 8C and 8D) and low hydrogen/carbon content (see FIGS. 8A and 8B). The simulated stash of cocaine looks different from sugar in that the drug has about equal amounts of hydrogen (see FIG. 8A) and carbon (see FIG. 8B) but very little oxygen (see FIG. 8D). The bright bar overlapped on the drug in the carbon image (see FIG. 8B) is the polystyrene handle of an umbrella. A pistol, a knife and a battery are visible in the "other" picture (see FIG. 8E). A glass lens in the camera is also very clear in the oxygen picture (see FIG. 8D). Two aluminum buckles can be seen on the top in the hydrogen picture (see FIG. 8A). As we have mentioned, the calculation splits aluminum content into hydrogen and "other" results.

Although examples involving detection of explosives and drugs were emphasized, other materials can also be identified and mapped by the signatures in their elemental composition. Moreover, the NRR principles discussed herein are not restricted to the elements discussed in the examples (particularly, hydrogen, carbon, nitrogen and oxygen), but can be used with a variety of other elements, as well. Another area of interest toward which the methods and apparatus of this disclosure can be applied is in on-site mineral analysis.

While this invention has been shown and described with references to particular embodiments thereof, those skilled in the art will understand that various changes in form and details may be made therein without departing from the scope of the invention, which is limited only by the following claims.

What is claimed is:

1. A method for mapping the elemental composition of an object, the method comprising the steps of:
   emitting a spectrum of neutrons from a source, wherein the energy of each emitted neutron is related to the angle at which the neutron is emitted from the source;
   positioning the object in the path of neutrons in a first radial sector of the neutron-emission spectrum;
   detecting neutrons that pass through the object when the object is positioned in the first radial sector and generating a reading of the detected neutrons;
   positioning the object in the path of neutrons in a second radial sector of the neutron-emission spectrum;
   detecting neutrons that pass through the object when the object is positioned in the second radial sector and generating a reading of the detected neutrons, wherein neutrons in at least one of the radial sectors have energies that vary across a range of at least about 60 keV; and
   measuring the presence of at least one element in the object as a function of the readings of neutrons detected in the first and second radial sectors.

2. The method of claim 1, wherein the object is positioned in more than two radial sectors of the neutron-emission spectrum, and readings of detected neutrons are generated for each sector.

3. The method of claim 2, wherein measurements for a plurality of elements in the object are generated from the readings of neutrons detected in the plurality of sectors.

4. The method of claim 3, further comprising the step of evaluating the element measurements to determine whether an explosive material is present in the object.

5. The method of claim 3, further comprising the step of evaluating the element measurements to determine whether a drug is present in the object.

6. The method of claim 3, wherein the object is a luggage item.

7. The method of claim 1, wherein the element is selected from hydrogen, carbon, nitrogen and oxygen.

8. The method of claim 7, wherein the presence of a plurality of elements selected from hydrogen, carbon, nitrogen and oxygen is measured.

9. The method of claim 7, wherein the presence of hydrogen in the object is measured.

10. The method of claim 1, wherein the object is positioned in different radial sectors by rotating the object about the source.

11. The method of claim 1, wherein the source includes a target positioned relative to a particle accelerator such that neutrons are emitted from the target when accelerated particles interact with the target.

12. The method of claim 11, wherein the target is selected from the group consisting of:
   a solid target having a thickness sufficient to reduce the energy of an accelerated particle by at least about 0.4 MeV as the particle passes through the target; and
   a gas target having a thickness of at least about 1 atm-cm.

13. The method of claim 1, wherein the spatial distribution of the element(s) is mapped throughout the object.

14. The method of claim 1, wherein neutrons in at least one of the sets have energies of at least 2.25 MeV.

15. A method for mapping multiple elements in an object comprising the steps of:
   directing a first set of neutrons that have energies within a first range at an object, detecting the neutrons from the first set that pass through the object, and generating a reading of the detected neutrons from the first set;
   directing a second set of neutrons that have energies within a second range at the object, detecting the neutrons from the second set that pass through the object, and generating a reading of detected neutrons from the second set;
   directing a third set of neutrons having energies within a third range at the object, detecting neutrons from the third set that pass through the object, and generating a reading of detected neutrons from the third set; and
   generating a map of at least one element in the object from the readings of detected neutrons from each of the three sets, wherein neutrons in at least one of the sets have energies of at least 2.25 MeV.

16. The method of claim 15, wherein maps of a plurality of elements in the object are generated from the readings of detected neutrons.

17. The method of claim 15, wherein the steps for each set of neutrons are performed for more than three sets of neutrons, each set of neutrons having energies within a respective range.

18. The method of claim 15, wherein neutrons in at least one of the sets have energies that vary across a range of at least about 60 keV.

19. The method of claim 15, wherein neutrons in at least one of the sets have energies extending across a range that covers multiple resonance features of a mapped element.

20. An apparatus for mapping elements in an object comprising:
   a particle accelerator for delivering accelerated particles;
   a neutron-emitting target positioned to interact with accelerated particles delivered from the particle accelerator to produce a neutron-emission spectrum, wherein the target is selected from the group consisting of a solid target having a thickness sufficient to reduce the energy of an accelerated particle by at least about 0.4 MeV as the particle passes through the target and a gas target having a thickness of at least about 1 atm-cm;
   a mount for supporting the object to be imaged;
   a drive mechanism coupled with at least one of the mount, the particle accelerator and the neutron-emitting target to allow the mount to be at different positions within the neutron-emission spectrum; and
   a detector configured to measure neutrons that pass from the target through an object supported by the displaceable mount.

21. The apparatus of claim 20, further comprising a computer processor in communication with the detector, the computer processor also being in communication with computer-readable storage medium storing software code for mapping a plurality of elements in the object based on readings from the detector.

22. The apparatus of claim 20, wherein the target has a thickness sufficient to reduce the energy of an accelerated particle by at least about 0.4 MeV as the particle passes through the target.

23. A computer-readable storage medium storing software code that, when executed by a computer, solves a linear equation set to calculate the amount of each of a plurality of elements simultaneously from neutron detection readings generated by a detector at multiple neutron energies with known neutron-attenuation coefficients for the plurality of elements at those neutron energies.

24. The computer-readable storage medium of claim 23, wherein the software code, when executed by a computer, further generates elemental images of an object through which the neutrons are passed before reaching the detector by processing position-specific readings of detected neutrons generated by the detector.

25. The apparatus of claim 24, further comprising:
   a computer processor coupled with the computer-readable storage medium;
   a neutron detector coupled with the computer processor; and
   a neutron source positioned to direct neutrons at the neutron detector.

26. A The apparatus of claim 25, further comprising an object positioned between the neutron source and the neutron detector such that the neutron detector can measure attenuation of neutrons passing from the source through the object.

* * * * *